United States Patent Office 3,253,935  
Patented May 31, 1966

3,253,935  
BASIC CARBON REFRACTORY  
Russell Pearce Heuer, Villanova, Pa., assignor to General Refractories Company, a corporation of Pennsylvania  
No Drawing. Filed Apr. 11, 1963, Ser. No. 272,208  
4 Claims. (Cl. 106—58)

The present invention relates to basic refractory brick and processes of making the same, and particularly to such brick which are suitable for use in the oxygen blowing process.

A purpose of the invention is to produce a refractory brick which is particularly useful for lining vessels used for the production of steel from pig iron by the oxygen blowing process.

A further purpose is to produce an improved refractory brick for oxygen converter use without the necessity of hot molding.

A further purpose is to obtain the advantages contributed by the presence of carbon in the refractory lining of an oxygen blowing process, including improved high temperature bond, and greater resistance to erosion, while at the same time avoiding the necessity to mold the brick at elevated temperature.

A further purpose is to prepare a refractory mixture suitable for making brick intended for use without kiln firing from raw materials containing principally calcined magnesia to which is added an aqueous bonding substance which is effective without kiln firing, and also pitch of relatively high melting point.

A further purpose is to employ a magnesia which has a lime silica ratio in excess of 1.3 and preferably in excess of 2.5, said lime being caused to react to form compounds which will eliminate or reduce the quantity of free lime to a safe limit, avoiding deterioration of the brick by hydration.

Further purposes appear in the specification and in the claims.

In the manufacture of steel by the oxygen blowing process, a vessel is conventionally used which is lined with refractory made from calcined dolomite or calcined magnesia or a mixture of the two. The oxygen blowing process forms a slag containing silica and iron oxide. Lime is added to make this slag basic so that the slag essentially contains a ratio by weight of lime to silica of as much as three or more.

When the oxygen blowing process is referred to, it is intended to include various forms including the L.D. process, the Kaldo process, the rotor process and other similar processes where a charge of iron is blown with gases containing more oxygen than that present in normal air and usually without the use of supplemental fuel.

The present invention is intended to improve the linings of vessels for oxygen blowing by eliminating the use of calcined dolomite as a refractory raw material. Instead, calcined magnesia containing more than 70 percent MgO and preferably those containing more than 80 percent MgO is used. It is not usually necessary to employ the higher priced magnesias which contain more than 90 percent MgO by weight.

In the prior art practice where dolomite is present in the refractory, it is necessary to bond the mixture by adding molten tar or pitch, since the use of aqueous bonding agents will cause hydration of the dolomite and destruction of refractory. When pitch is used, it is necessary to mix it with the refractory and press the brick at a temperature above 200° F. This requires special techniques in brick making, as compared to those used in making bricks which are tempered with water and pressed at ambient temperature. If molten tar is used it is possible to press the brick at ambient temperature but the resultant bricks are weaker than pitch bonded bricks. Thus there are difficulties at the present time in using either pitch or tar in manufacturing basic refractory bricks.

By eliminating dolomite, the use of a bond of pitch or tar can also be eliminated.

The calcined magnesia present may contain lime in amounts up to 12 percent or even more. When lime is present the calcine can be made unreactive to water by causing the lime to be present as dicalcium ferrite, $2CaO.Fe_2O_3$, brownmillerite, $4CaO.Al_2O_3$, or one of the calcium silicates.

Typical analyses of calcined magnesias which may be used in the present invention are as follows:

|  | I | II | III |
|---|---|---|---|
| $SiO_2$ | 0.5 | 1.0 | 3.5 |
| $Al_2O_3$ | 0.3 | 0.3 | 0.6 |
| $Fe_2K_3$ | 5.5 | 5.8 | 6.0 |
| $CaO$ | 4.0 | 6.1 | 12.1 |
| $MgO$ (diff.) | 89.7 | 86.8 | 77.8 |

It is very desirable in the present invention to use from 70 to 98.5 percent of calcined magnesia in the refractory.

The calcined magnesia should have a lime silica ratio exceeding 1.3, and preferably exceeding 2.5. The reason for requiring a lime silica ratio of this character is to avoid the presence of excessive amounts of monticellite ($CaO.MgO.SiO_2$) in the refractory and to have silica impurity present in the form of $3CaO.MgO.2SiO_2$ or $2CaO.SiO_2$ or $3CaO.SiO_2$.

The brick of the invention also contain from 1 to 25 percent by weight, preferably from 4 to 20 percent, and most desirably from 5 to 15 percent of hard pitch having a softening point of about 300° F. or above.

I also employ a bonding agent which is made effective in the presence of water, in a quantity of ½ to 8 percent by weight, preferably 1 to 7 percent by weight, and most desirably 1.1 to 5 percent by weight. Suitable bonding agents for this purpose are sulfuric acid, magnesium sulfate, sulfite paper waste, starch, dextrine, and other organic gums of well known character.

EXAMPLE I

Calcined magnesia of Type I shown above is crushed, ground and screened to prepare coarse (A) particles passing through a screen having four mesh per linear inch, and resting on eight mesh, coarse (B) particles passing through a screen having eight mesh per linear inch and resting on a screen of twenty mesh per linear inch, and fine (C) particles, passing through a sixty-five mesh per linear inch screen. These particles are mixed together in the following proportions by weight:

|  | Percent |
|---|---|
| A particles | 30 |
| B particles | 30 |
| C particles | 40 |

Hard pitch having a softening point of about 300° F. is ground to pass through a screen having 100 mesh per linear inch. Similar results have been obtained using coarser and finer particles of hard pitch. This ground hard pitch was added to the screened magnesia mixture to obtain a composition containing 6 percent of hard pitch and 94 percent by weight of calcined magnesia. To this was added dilute sulfuric acid of 18° Bé to 25° Bé. sufficient to temper the composition suitably to press it into brick. The resultant wet mix included 1.0 percent by weight of sulfuric acid and about 3 percent on the dry mixture of moisture was present. The mixture was then pressed into brick form at a pressure of 15,000 p.s.i. and at ambient temperature. The pressed brick are then dried using any suitable technique, the particular procedure employed being drying at 250° F. The brick are then ready for use and are very satisfactory for use in an oxygen blowing vessel in steel manufacture. For best results the brick have been subjected to gaseous carbon dioxide for six hours at a pressure of 15 p.s.i. gauge before drying to improve their strength. This is the technique well known in the art.

The properties of the brick after treatment with carbon dioxide prepared as above are as follows:

Bulk specific gravity _____ gms./cc.__ 2.68
Modulus of rupture _____ p.s.i.__ 1100

The brick of Example I have been found to be very resistant to moisture and they do not suffer less in physical strength when exposed to the atmosphere, in this respect differing from bricks which contain dolomite. They are made using ordinary magnesia brickmaking machinery, and no preheating of the mixture is required prior to mixing or pressing as in the case of bricks which receive a low temperature bond from pitch. Sulfuric acid as an aqueous binder produces strong brick without firing. When the brick are subjected to service in the oxygen blowing process the hard pitch forms a coked mass which surrounds the particles of magnesia. This coked mass bonds the particles of magnesia together at high temperature and also protects them from destructive attack by the slag which is used in the oxygen blowing process. The combined effect of the low temperature bond developed by the sulfuric acid and the high temperature bond from the coked pitch produces brick of high quality and the process of manufacture is quite simple.

Substantially identical results can be obtained using chemically equivalent amounts on a sulfate basis of magnesium sulfate.

Similar results also can be obtained using various organic adhesives such as sulfite paper waste, starch, dextrine, or any of the organic adhesive gums such as gum tragacanth.

The brick of Example I has a lime silica ratio well in excess of 2.5 and this is an important factor in its successful use as explained elsewhere.

EXAMPLE II

Calcined magnesia of Type III is used as a raw material following the procedure of Example I except as explained herein. The screened magnesia is made into a mixture containing 7 percent by weight of powdered hard pitch, and in the final brick 2 percent by weight of sulfite liquor is incorporated as a binder, the sulfite liquor being introduced with sufficient water to temper the mass for pressing, as well known in the art.

The bricks of Example II are pressed at 10,000 p.s.i., dried at 250° F. and are then ready for use. The properties are comparable with those obtained in Example I.

EXAMPLE III

In this example, Type II magnesia is used as a raw material. The lime silica ratio in this case is 6.1. This magnesia is mixed with Type IV magnesia which is not in itself suitable for use in the brick of the invention, and which has a lime silica ratio less than 1. The composition of Type IV magnesia is as follows:

$SiO_2$ _____ 5.0
$Al_2O_3$ _____ 0.4
$Fe_2O_3$ _____ 0.6
CaO _____ 1.1
MgO (diff.) _____ 93.9

In this case 75 parts by weight of Type II magnesia and 25 parts by weight of Type IV magnesia are mixed together to produce a magnesia having a lime silica ratio of approximately 2.4. Upon heating to the temperature of the oxygen converter the forsterite and monticellite present in Type IV magnesia will react with the dicalcium ferrite present in Type II magnesia to form dicalcium silicate, magnesium ferrite and magnesia which will bind the magnesia particles together and make a highly satisfactory brick.

In the actual technique of producing the brick, Type IV magnesia is ground and screened to form fine (D) particles which pass a 65 mesh screen. The Type II magnesia is ground and screened to form A, B and C particles as above defined in Example I. The preferred mixture of these particles in percentage by weight is as follows:

|   | Percent |
|---|---|
| A particles | 30 |
| B particles | 30 |
| C particles | 15 |
| D particles | 25 |

This mixture is made into a mixture with hard pitch as referred to above, the mixture containing 6 percent by weight of hard pitch and 94 percent by weight of magnesia. This composition is bonded with dilute sulfuric acid and pressed into brick, treated with carbon dioxide and dried at 250° F. all as described in Example I and then is suitable for use in an oxygen converter lining.

In general, I find that the calcined magnesia which is used as a major component and which will effectively make up the entire brick other than the hard pitch and the bond made effective by water, should contain more than 80 percent of magnesia, but it need not have a magnesia content in excess of 90 percent.

The magnesias referred to as Type I, Type II and Type III have been prepared by calcining natural magnesium carbonate which occurs in Austria. Type I and Type II are obtained by beneficiation by mechanical means before calcining. As a matter of economy magnesias containing less than 90 percent MgO by weight are recommended, particularly when the associated oxide is principally lime. Type IV magnesia is commonly produced by calcining magnesium hydroxide prepared by chemical means. Natural magnesite can also be used as a starting material for producing Type IV calcined magnesia. Type III magnesia is obtained from natural Austrian magnesite without beneficiation.

It is important to keep in mind that when the calcined magnesia contains lime as the principal associated oxide, the lime should not be present as free lime since this will hydrate under the conditions of moist pressing or during service and destroy the integrity of the brick. If silica is present in the magnesia, and the mol ratio of lime to silica exceeds 2, the calcining operation will form dicalcium silicate, $2CaO.SiO_2$. If any lime remains in an uncombined state beyond that which reacts as above, it will combine with iron oxide present to form dicalcium ferrite, $2CaO.Fe_2O_3$ and brownmillerite,

$4CaO.Al_2O_3.Fe_2O_3$

If any unreacted lime still remains, it will form tricalcium silicate, $3CaO.SiO_2$. Lime present in any of the above compounds is not objectionable as it is combined and not free and cannot hydrate.

If a magnesia is used which would not have the required lime silica ratio, it is important to adjust the composition so that in the final brick the ratio by weight of lime to silica will exceed 1.3 and preferably will exceed 2.5 or even more.

The percentages given are percentages by weight.

The mesh size referred to is Tyler standard mesh per linear inch.

In view of my invention and disclosure, variations and modifications to meet individual whim or particular need will doubtless become evident to others skilled in the art, to obtain all or part of the benefits of my invention without copying the process and composition shown, and I,

Having thus described my invention, what I claim as new and desire to secure by Letters Patent is:

1. A refractory brick adapted to be installed for use as a lining component, said brick consisting essentially of calcined magnesia particles having at least 70 percent of MgO by weight of the calcined magnesia, having silica and having lime combined as a compound of the class consisting of dicalcium ferrite, brownmillerite and a calcium silicate, said lime and silica being in a lime-silica ratio exceeding 1.3 as totally present in the calcined magnesia, and free from uncombined lime, of 1 to 25 percent of hard pitch particles in mixture on the dry weight of the brick with said magnesia particles, and a rigid interconnecting bond between said magnesia particles and said hard pitch particles, said rigid bond being formed from a member of the group consisting of sulfuric acid, magnesium sulfate, sulfite paper waste and organic gums.

2. A refractory brick of claim 1, in which the lime-silica ratio exceeds 2.5.

3. A process of making refractory brick adapted to be used as a lining component, which comprises mixing calcined magnesia particles having at least 70 percent of MgO by weight of the calcined magnesia, having silica, and having combined lime in a compound of the class consisting of dicalcium ferrite, brownmillerite and a calcium silicate, said lime and silica being in a lime-silica ratio exceeding 1.3 as totally present in the calcined magnesia, and said calcined magnesia being free from uncombined lime, from 1 to 25 percent of hard pitch particles on the dry weight of the brick and 0.5 to 8 percent on the dry weight of the brick of a bonding agent of the class consisting of sulfuric acid, magnesium sulfate, sulfite paper waste and an organic gum, plus water, molding a brick of the mixture at room temperature under a pressure exceeding 5,000 p.s.i. while the mixture of magnesia and hard pitch particles is still moist, and drying the molded brick.

4. A process of claim 3, in which the lime-silica ratio exceeds 2.5.

References Cited by the Examiner

UNITED STATES PATENTS

| | | | |
|---|---|---|---|
| 2,656,279 | 10/1953 | Heuer | 106—58 |
| 3,030,228 | 4/1962 | Hernandez et al. | 106—58 |
| 3,070,449 | 12/1962 | Davies et al. | 106—56 |
| 3,168,602 | 2/1965 | Davis et al. | 106—58 |

TOBIAS E. LEVOW, *Primary Examiner.*

J. POER, *Assistant Examiner.*